United States Patent [19]

Harrington et al.

[11] 4,343,527

[45] Aug. 10, 1982

[54] TELEPHONE CONNECTING DEVICE

[75] Inventors: Patrick C. Harrington, Edgewood, Md.; Milton I. Levin, Langhorne, Pa.; Walter H. Shope, Fallston; Max K. Wilson, Cockeysville, both of Md.

[73] Assignee: Western Electric Company, Inc., New York, N.Y.

[21] Appl. No.: 145,194

[22] Filed: Apr. 29, 1980

[51] Int. Cl.³ .............................................. H02B 1/10
[52] U.S. Cl. ............................... 339/125 R; 179/1 PC
[58] Field of Search .................. 179/1 PC; 339/91 R, 339/125 R, 126 R, 176 M, 107, 154 R, 154 H

[56] References Cited

U.S. PATENT DOCUMENTS

| | | | |
|---|---|---|---|
| 3,380,015 | 4/1968 | Gainer et al. | 339/107 |
| 3,798,587 | 3/1974 | Ellis et al. | 339/97 P |
| 3,860,316 | 1/1975 | Hardesty | 339/91 R |
| 3,990,764 | 11/1976 | Kurnreich | 339/176 M |
| 4,024,953 | 5/1977 | Nailor | 206/344 |
| 4,040,699 | 8/1977 | Rasmussen | 339/91 R |
| 4,050,768 | 9/1977 | Gumb | 339/154 A |
| 4,071,696 | 1/1978 | Anderson | 179/1 PC |
| 4,088,384 | 5/1978 | Gumb | 339/156 R |
| 4,146,292 | 3/1979 | Garrett | 339/125 R |
| 4,178,062 | 12/1979 | Albo | 339/154 A |
| 4,188,082 | 2/1980 | Dickey | 339/36 |
| 4,188,505 | 2/1980 | O'Connor | 179/1 PC |
| 4,269,463 | 5/1981 | Bertenburgh | 339/126 R X |

Primary Examiner—Eugene F. Desmond
Attorney, Agent, or Firm—E. W. Somers

[57] ABSTRACT

A telephone connecting device which is capable of being mounted either within a wall to present a flush face plate in which is supported a modular jack for receiving a modular plug of a cord connected to station equipment or on an exterior surface of a wall includes a plastic receptacle which includes facilities for terminating a wall cable and for connecting the wall cable to the jack in the face plate. This permits a craftsperson during an initial visit to a home such as during construction to install a receptacle and to connect the wall cable to the terminating facilities within the receptacle. In order to have service, a customer acquires a face plate having a modular jack supported therein, connects conductors that are connected to contact elements of the jack to the terminating facilities and secures the face plate to the receptacle.

12 Claims, 14 Drawing Figures

TELEPHONE CONNECTING DEVICE

TECHNICAL FIELD

This invention relates to a telephone connecting device, and more particularly to a connecting device which is specially capable of being mounted in a wall and connected to service wiring to facilitate the later connection of a telephone to the service wiring.

BACKGROUND OF THE INVENTION

Customer telephone equipment today is marketed to be compatible with a system which is characterized as being modular. As applied to telephone station equipment which is normally used by a telephone subscriber, a modular system involves telephone handsets, cords and wall receptacles which are easily interconnected through a system of modular plugs and jacks to service wiring. Modular plugs and jacks are described in U.S. Pat. Nos. 3,860,316 and 3,990,764 for example which issued on Jan. 14, 1975 and on Nov. 9, 1976 in the name of E. C. Hardesty and in the name of C. L. Krumreich, respectively.

It has been the usual practice for a telephone operating company to prewire newly constructed homes with outlets being placed in ones of the rooms and for craftspersons to later revisit the homes on an individual basis as new service, additional service or changed service is required. This practice involves the additional expense of a second visit to a location by the craftsperson.

Seemingly, this second visit could be obviated by installing an outlet box which includes an exposed modular jack. By this technique, which is referred to as pre-jacking, a customer need only acquire a telephone handset of his or her choice and a line cord which is terminated at each of its ends with a modular plug such as that disclosed in above-identified U.S. Pat. No. 3,860,316 and then insert one plug end of the line cord into the wall outlet jack and the other end into a jack mounted in the handset.

The problem with this obvious and simplistic approach is that under existing regulations in some states, a pre-jacking tariff would attach to the outlet once the exposed jack is installed. What is needed is a wall mountable connecting device which is installed by a craftsperson with service wiring connected thereto and which is capable of having a store-acquired modular jack assembled thereto so that it is exposed to a room and connected to the service wiring to provide a communications path from the jack into the telephone network.

Even in those states in which there is no pre-jacking tariff, the installation of a face plate which includes an exposed jack by a craftsperson during the construction of a home, for example, is not an acceptable solution to the problem of multiple visits by the craftsperson. If the craftsperson were to attach an outlet box to a wall stud and then install the face plate with an exposed jack, the installation of the wall board or other wall finish material in the usual manner would most likely result in damage to the face plate which is intended to engage the outer surface of the wall finish material.

In the prior art, various wall outlet box and mounting plate arrangements are shown for example in U.S. Pat. Nos. 3,619,476 and 4,146,292. Another arrangement which is shown in U.S. Pat. No. 4,040,699 includes a wall mounted jack in which an end portion of each of a plurality of wire-like contact elements are exposed within a cavity of the jack to engage terminals of a plug inserted into the cavity. The other end portions of the contact elements are connected to terminal screws to allow interconnection with one of a plurality of leads pulled into the outlet receptacle. A surface mounted unit is shown in U.S. Pat. No. 4,071,696 and includes a bracket to which are connected distribution wires and to which is assembled a cover having a jack the terminals of which engage the terminals of the bracket through contact springs.

While the prior art is replete with patents covering various aspects of telephone modularity and with arrangements for interconnecting customer station equipment with distribution wiring, there does not appear to be a device which is available and which overcomes the above-identified problems.

SUMMARY OF THE INVENTION

The foregoing needs which appear to remain unsolved by the prior art are solved by the connecting device of this invention, said connecting device including a receptacle which is capable of being attached to structural elements within a wall or to an outside surface of a wall. The receptacle includes means for establishing an electrical connection with each of a plurality of individual insulated conductors of a service cable that is mounted within the wall. After the device has been installed, a face plate which includes a modular jack mounted thereto is easily assembled to the receptacle. Conductors which are connected to wire-like contact elements of the jack for engagement with terminals of a plug that is insertable into a cavity of the jack are easily connectable to said means within said receptacle for establishing the electrical connections with the conductors of a service cable to electrically connect the jack to the service cable.

This arrangement allows a craftsperson to install the receptacle and terminate the service cable within the receptacle and a customer to acquire the face plate and install it in the receptacle to facilitate the subsequent insertion of a plug terminated line cord of a telephone in the cavity.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
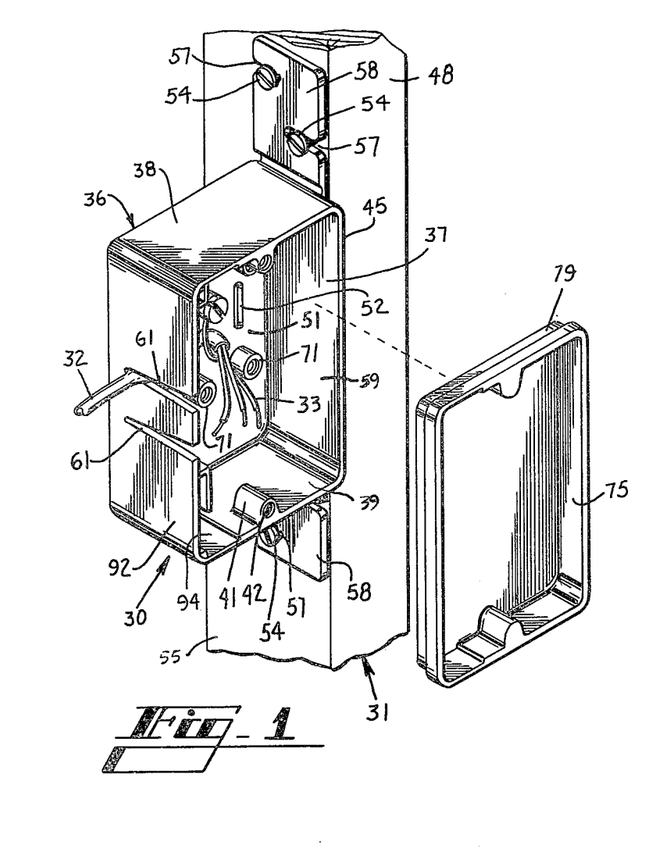
FIG. 1 is a perspective view of a connecting device of this invention installed in a wall and having a cover which is replaced with a service plate at such time as desired.

Referring now to FIG. 1, there is shown an electrical outlet box which is referred to as a receptacle and which is designated generally by the numeral 30, for electrically connecting telephone subscriber station equipment to a distribution cable network. In FIG. 1, the receptacle is shown used within a wall 31 of a home, for example, for connecting a telephone (not shown) to a service cable 32 such as, for example, the familiar D-station wire which comprises a plurality of individually insulated conductors 33—33. It is to be understood that the service cable could be a cord which includes a plurality of individually insulated conductors.

The receptacle 30 includes a housing 36 which is made of a plastic material such as polycarbonate for example. The housing 36 has a generally prismatic configuration with a rectangularly shaped opening 37 that communicates an interior of the housing with a room into which it faces. Top and bottom walls 38 and 39 of the housing 36 are formed with projecting portions 41—41 which have apertures 42—42 formed therein for receiving fasteners 43—43.

Figure 2:
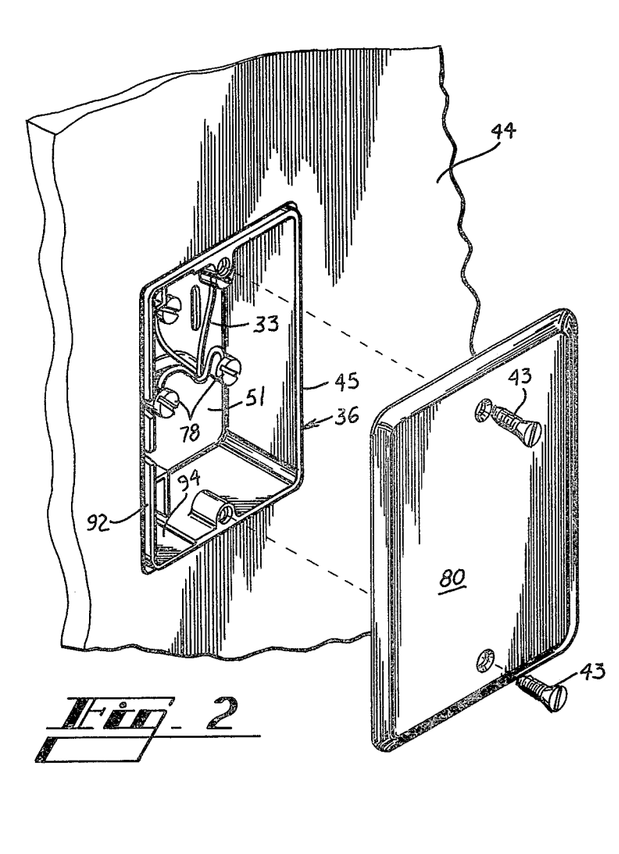
FIG. 2 is a perspective of the device of FIG. 1 and showing an alternative cover plate and the connection of wall wiring to the device.

The receptacle 30 is capable of being surface mounted on an externally facing surface of wallboard 44 of the wall 31 which faces into a room or onto a stud 48 within the wall so that a peripheral rim 45 of the housing is flush with a finished surface of the wallboard (see FIG. 2). For surface mounting, a rear wall 51 of the receptacle 30 is provided with two oblong openings 52 and 53 (see FIG. 4) with the longitudinal axes of these openings being normal to each other. Mounting screws 54—54 are turned through the openings and into a wall stud. Mounting within the wall 31 is accomplished by turning mounting screws 54—54 into the side surface 55 of a stud 48 through slotted openings 57—57 formed in ears 58—58 that extend in opposite directions from a side wall 59 of the receptacle. Should the receptacle 30 be surface mounted, the ears 58—58 are easily removed.

Figure 3:
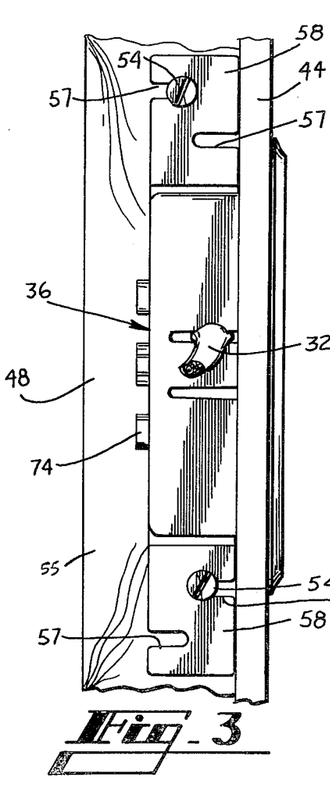
FIG. 3 is a side elevational view of the device of this invention as mounted within a wall.

The receptacle 30 also includes provisions for receiving an end portion of D-station wire 32 or other kinds of cordage. For a flush mounting, the receptacle 30 includes a pair of tapered slots 61—61 which are formed in a side wall 62 of the receptacle. The tapering of the slots 61—61 allows a craftsperson to move cordage of varying diameters into either or both of the slots with the walls of the receptacle which define the slots engaging the cordage jacket to provide strain relief for the cord. Since the rim 45 of the housing 36 is generally flush with the externally facing surface of the wall board 44, the wallboard effectively closes off the outer ends of the slots 61—61 and thereby prevents inadvertent movement of the cords out of the slots (see FIG. 3). For a surface mounting, the D-station wire 32 or cordage is routed from within the wall 31 through an opening 63 formed in the rear wall 51 of the housing.

Figure 4:
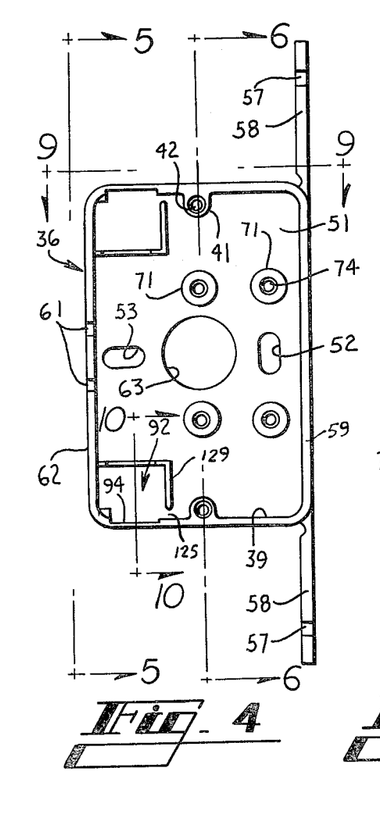
FIG. 4 is a front elevational view of a receptacle of this invention.
Figure 5:
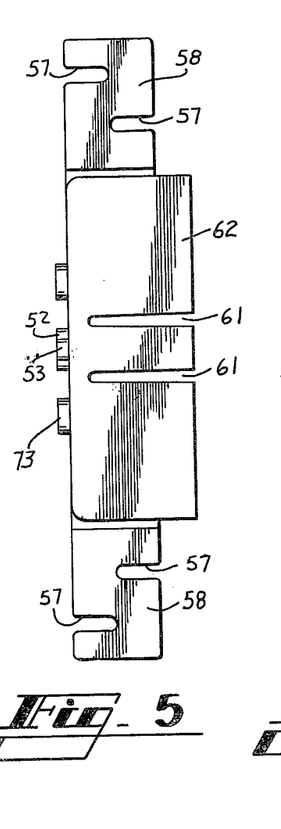
FIG. 5 is a side elevational view of the receptacle of FIG. 4 which shows provisions for mounting the receptacle on a wall stud and provisions for strain relief of a cable or a cord which is routed into the receptacle.
Figures 6, 9, 10:
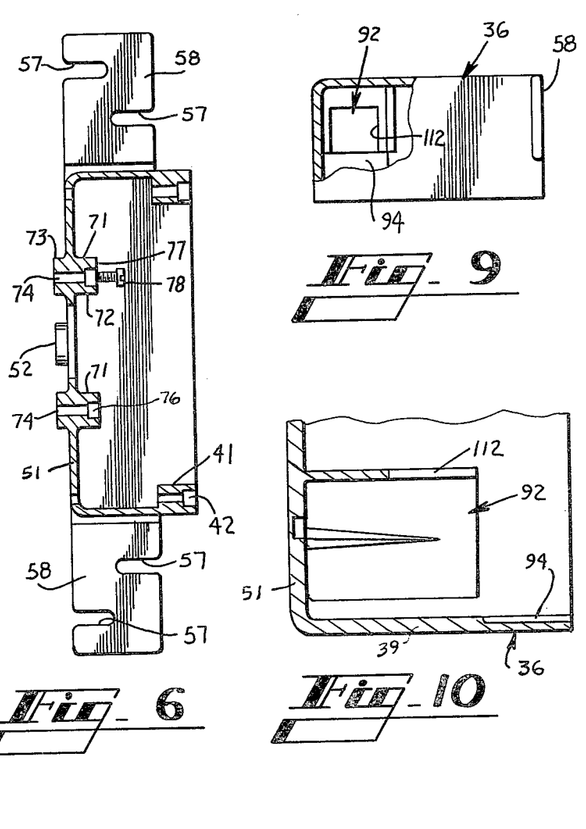
FIG. 6 is a side elevational view partially in section of the receptacle shown in FIG. 4 and taken along lines 6—6 thereof.
FIG. 9 is a top plan view of the receptacle and taken along lines 9—9 in FIG. 4 with portions thereof broken away for clarity.
FIG. 10 is a detailed view of a corner portion of the receptacle of FIG. 4 to show provisions for mounting a modular jack in the receptacle.

Provisions for terminating individual conductors 33—33 of the D-station wire 32 are best shown in FIGS. 4-6. A plurality of terminal receiving posts or bosses 71—71 which are visually distinguishable one from the other such as by a letter or numeric designation are formed integrally with the rear wall 51 with a portion 72 of each projecting into the housing 36 and a portion 73 projecting from an exterior surface of the rear wall 51. The portion 73 permits the rear wall of the housing to be spaced slightly from the wallboard in a surface mount installation to avoid damage to the housing or the conductors by cleaning solutions which may be flowed along the wall. A stepped bore 74 is formed through each of the bases 71—71 with a large diameter portion 76 opening to an inwardly facing surface 77 of the portion 72. Each of the openings 74—74 is adapted to receive a headed self-tapping terminal screw 78 that is turned thereinto for securing a conductor of the D-station wire 32 between the surface 77 and captivated washers adjacent the headed end of the screw 78.

The prewiring installation by the craftsperson is completed by mounting a cover 75 (see FIG. 1) over the opening 37. The cover 75 is made of a plastic material that is formed with a peripheral groove 79 that is adapted to receive the peripheral rim 45 of the housing. The cover encloses the housing and presents an aesthetically acceptable appearance until customer demand dictates use of the receptacle. As an alternative, the craftsperson, the builder or even the customer may remove the cover 75 and replace it with a plastic protective blank face plate 80 (see FIG. 2) which engages the outwardly facing surface of the wallboard 44.

At this time, the receptacle 30 has been prewired with the service cable and is now prepared for finish wiring by a customer. Once a customer decides to use a particular receptacle of a premises that has been prewired in accordance with this invention, the customer acquires a kit which is available from a Phone Center Store, for example. The kit includes connective elements which are adapted to be connected to the wall wiring that has been terminated within the receptacle 30 and which are capable of having a modular telephone cord connected thereto to provide service to the customer.

The face plate 80 or the cover 75 is removed and is replaced with a metallic service ring plate 81 (see FIG. 7) having a modular jack 82 molded in a stepped support member 83 mounted therein. The metallic ring plate 81 has extending portions 84—84 through which fasteners 43—43 are turned to secure the ring plate to the housing. Generally, the rim 45 of the housing 36 is not precisely flush with the outwardly facing surface of the wallboard 44. The metallic ring plate 81 is capable of being flexed in order to be secured to the receptacle should it be recessed slightly within the wallboard.

Figure 7:
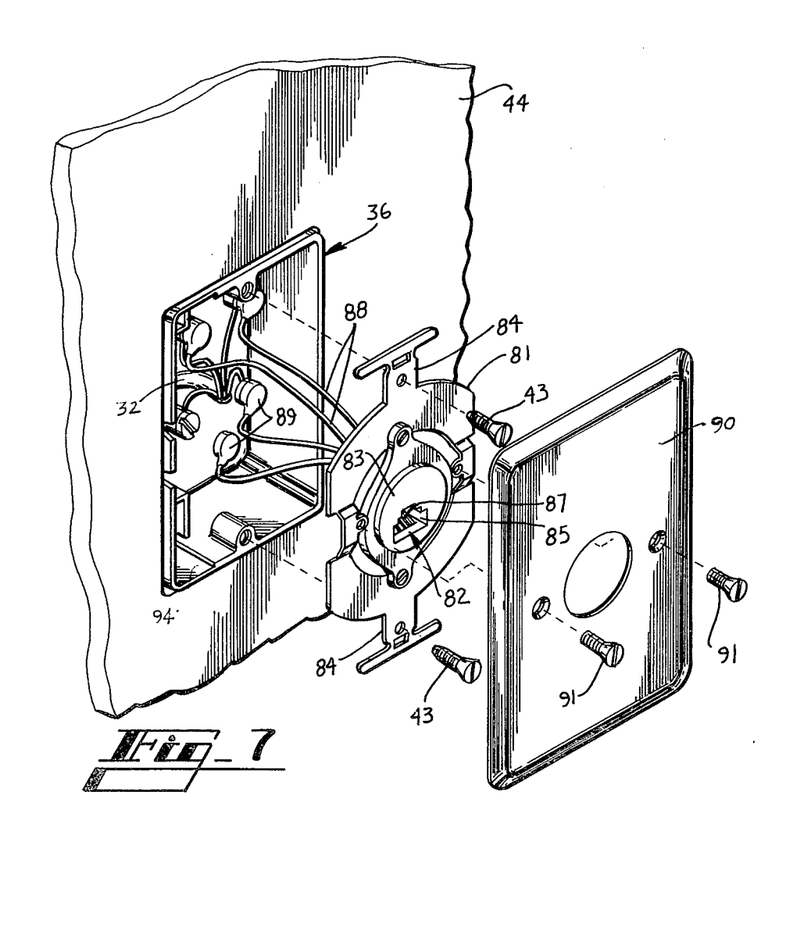
FIG. 7 is a perspective view of the connecting device of FIG. 1 with the cover plate having been replaced with the service plate that includes a modular jack that is connectable to the connecting device.

The modular jack 82 may be one for example such as that shown in U.S. Pat. No. 3,850,497 which issued on Nov. 26, 1974 in the names of C. L. Krumreich et al. or in U.S. Pat. No. 3,990,764 which issued on Nov. 9, 1976 in the name of C. L. Krumreich, both of which are incorporated by reference hereinto. The jack 82 includes an outwardly facing cavity 85 that is adapted to receive a modular plug such as that shown for example in U.S. Pat. No. 4,148,539 which issued on Apr. 10, 1979 in the name of E. C. Hardesty and which is incorporated by reference hereinto. The jack 82 also has a plurality of wire-like contact elements 87—87 to which are connected the conductors 88—88 that are terminated with so-called "pan" connectors 89—89.

Figure 8:
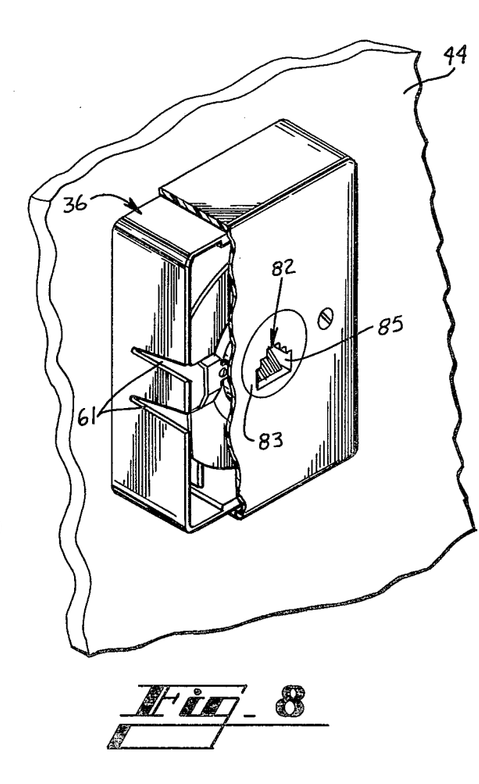
FIG. 8 is a perspective view of the connecting device of FIG. 8 mounted on an exterior surface of a wallboard in a surface mount installation.

Prior to the mounting of the service ring plate 81 to the housing 36, the pan connectors 89—89 of the conductors 88—88 are snapped over correct ones of the terminal screws 78—78. This completes a plurality of electrical paths from the contact elements 87—87 of the jack 82 to the terminal screws 78—78 and hence to the service cable 32. Then the service ring plate 81 is secured to the housing 36 with the fasteners 43—43 and a face plate 90 is secured to the ring plate with fasteners 91—91. For a surface mounting, the face plate 90 is modified so that it completely encloses the housing (see FIG. 8).

Each of two opposite corners of the housing 36 is provided with a nest 92 (see FIGS. 4 and 9-10) having a channel 94 for mounting a modular jack 93. The modular jack 93 may be identical to the jack which is disclosed in U.S. Pat. No. 3,990,764. The jack nests 92—92 are used to connect a service cable 32 such as a wall cord (see FIG. 11) which is terminated with a modular plug 95 to a jack 96 that is mounted in a service ring plate 97. This is accomplished by an installer or by a customer who acquires an installation kit and who removes the solid face plate 75. The installation kit includes the service ring plate 97 which may be identical to the ring plate 81 and having the jack 96 mounted therein, a service plate 98 having an opening 99 therein which is adapted to receive a small portion 101 of a support member 102 in which is mounted the jack 96, and fasteners 105—105. The jack 96 is of the type shown in above-mentioned U.S. Pat. No. 3,990,764 and of the same design as the jack 82, and includes a plurality, e.g. four, six or eight of wire-like contact elements 103—103 which are connected through conductors 104—104 to a harness or carrier 106 (see FIG. 12) which comprises a portion of the jack 93. It should be understood that a jack 93 could be mounted in each nest 92 with two cords being routed into the receptacle through the slots 61—61 to be connected to two jacks 96—96 in a ring plate.

Figures 11, 12, 14:
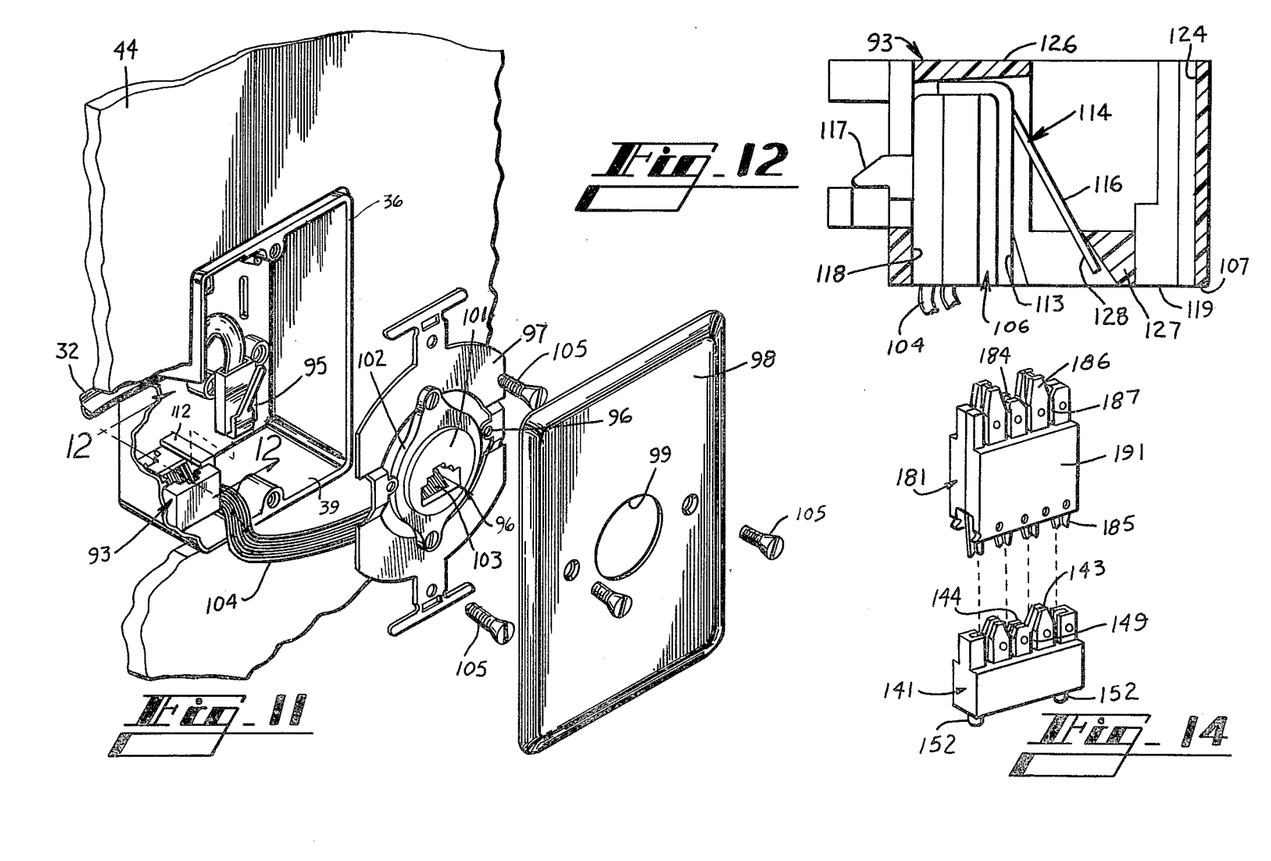
FIG. 11 is a perspective view of an alternative embodiment of this invention installed in a wall and having a service plate which includes a jack, which is to be connected to conductors of a service cable.
FIG. 12 is an enlarged view of a modular jack which is adapted to be mounted in a nest of the receptacle of this invention.
FIG. 14 is a perspective view of an index strip and connector module arrangement within the receptacle of FIG. 13.

The carrier 106 or harness as it is commonly termed may already be assembled to a jack frame 107 in which case the customer need only slide the entire jack assembly into one of the nests 92—92. On the other hand, if the jack frame 107 had already been positioned in the housing 36 by the craftsperson, the customer must remove it and install the harness in the jack body.

The jack 93 which is mounted within the housing 36 comprises the dielectric contact element carrier or harness 106 which includes a multiplicity of orifices 113—113 (see FIG. 12) which extend from the front to the rear thereof and in which a plurality of contact spring assemblies 114—114 are mounted. Free end portions of contact springs 116—116 of the assemblies 114—114 have a retroflexed configuration so that they extend rearwardly in cantilever fashion beneath the carrier. A wedge-shaped latch 117 extends upwardly from the carrier within the jack frame 107.

The carrier 111 is accommodated by an opening 118 (see FIG. 12) in a rear side 119 of the dielectric support or jack frame 107. The opening 118 leads to a carrier-receiving cavity in the upper portion of the support and the upper surface of the cavity includes a recess for receiving the latch 117 of the carrier. The support 107 further includes a modular plug-receiving cavity 124 which opens to a front side 126 of the dielectric support and that is situated beneath the carrier-receiving cavity. Also, the support includes a slotted wall 127 for constraining the free ends 128—128 of the cantilever portions of the spring contacts, the wall being located at the rear of the plug-receiving opening. The open ends of the slots 127—127 are adjacent to the carrier-receiving openings and the slots are equal in number to the number of wire spring contact elements and laterally spaced the same distance apart as the fixed ends of the cantilever portions.

When the modular plug 95 is received in the cavity 124 of the jack 93 in the nest 92 of the housing 36, terminals (not shown) in the plug engage the portions of the wire-like contact elements that are exposed within the cavity to establish electrical engagement of the plug with the jack.

As can be seen in FIG. 11, the jack 93 is installed within one of the nests 92—92 so that a cavity 124 thereof faces upwardly into the housing 36. The jack frame 107 is received between opposing, overhanging portions 112—112 of a wall of the nest 92 in a tight fit so that the jack frame is held securely within the receptacle 36. Conductors 104—104 of the harness 106 are routed through an opening 125 between a wall 129 of the nest 92 and the bottom 39 of the housing 36.

Then the customer secures the service ring plate 97 to the housing 36 with fasteners 105—105 which are turned into the openings 42—42 and secures the service plate 98 to the ring plate with the fasteners 105—105. The receptacle 30 is then ready to accept a modular plug of telephone line cord (not shown) to provide service to the customer.

In order to complete transmission paths along more than four conductors between particular kinds of station equipment and a wall cable, a receptacle 130 (see FIG. 13) in accordance with this invention terminates ends of a plurality of conductors 131—131 of a wall cable 135 and connecting these to contact elements 132—132 of an exposed jack 133. This may be accomplished by constructing the receptacle 130 to not only include the housing 36 of the hereinbefore-described embodiment but also to include an index strip 141 (see also FIG. 14) which is formed integrally with the housing or which is attached thereto as the need arises. The index strip 141 is one of the elements of a solderless, quick-connect system such as that shown for example in U.S. Pat. No. 3,798,587 which issued on Mar. 19, 1974 in the names of B. C. Ellis, Jr., Christian Scholly, C. McGonigal and J. H. Snyder and which is incorporated by reference hereinto.

As is disclosed in the above-identified Ellis et al. patent, the index strip 141 includes two rows of parallel extending opposing alternating height teeth 143 and 144 extending from a floor with opposing ones of the teeth 143 and 144 connected by separators. Top faces of the alternating height teeth 143 and 144, respectively, are squared off and have tapered side portions to form flared entrances for guiding associated ones of the conductors from the jack into conductor-receiving grooves or fanning slots 149—149 which are formed between adjacent ones of the teeth. The above-mentioned Ellis et al patent shows the construction of the index strip to include pegs 152—152 which could be used for example to mount an index strip having eight conductor-receiving grooves formed therealong in engagement with the rear wall 51 of the housing 36.

Figure 13:
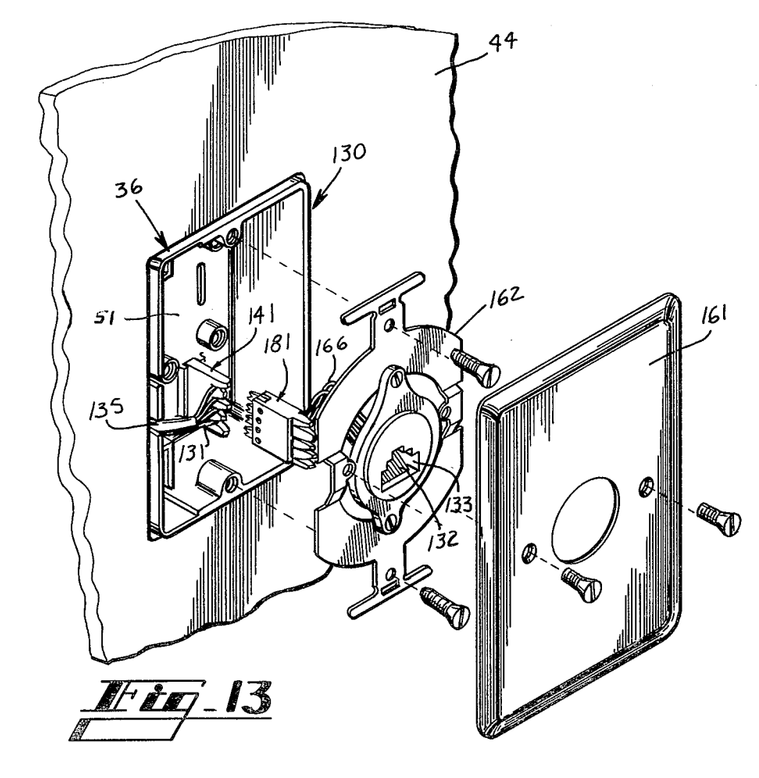
FIG. 13 is a perspective view of another alternative embodiment of a receptacle of this invention which includes an index strip of a quick-connect device for terminating individually each of a plurality of conductors of a wall-routed cable.

A craftsperson mounts the housing in engagement with a stud 48 and routes the wall cable 135 into the housing. Conductors 131—131 are positioned individually in ones of the conductor-receiving grooves of the index strip 141. Then the craftsperson covers the open side of the housing with a blank plate 80 by turning screws through openings in the plate and into the openings 42—42 or with one of the covers 75—75.

When the receptacle 130 is to be used to connect station equipment to the cable 135 within the wall, a customer acquires the station equipment and an installation kit from a supply store. The kit typically would include a service plate 161 and a ring plate 162 in which is mounted the modular jack 133 having a cavity adapted to face outwardly toward the customer station equipment. Wire-like contact elements 132—132 of the jack 133 in the ring plate 162 are connected to conductors 166—166 which must be connected to the conductors of the wall cable.

The interconnection of the conductors 166—166 and the conductors 131—131 of the wall cable 135 is accomplished with the index strip 141 in which are mounted the conductors of the wall cable in cooperation with a connector module designated generally by the numeral 181 (see FIGS. 13 and 14). The connector module 181 which may be made to accommodate any number of conductors is one that in a preferred embodiment holds eight conductors 131—131 which are to be connected to the same number of conductors in the index strip 141.

The connector module 181 which is disclosed and claimed in the above-identified Ellis et al. patent includes mating parts made of a dielectric material and secured together to hold therein a plurality of quick connect contact elements 185—185. Each contact element 185 is the well known double bifurcated beam type having a conductor-receiving slot formed in each of the bifurcated beams. The contact elements 185—185 are mounted within the assembly of plastic parts so that portions of one of the bifurcated beams protrudes between adjacent areas of a plurality of alternating height teeth 184 and 186 that extend upwardly from a central body portion. The teeth 184 and 186 are formed to have a V-shaped entrance to a groove 187 formed between each two adjacent teeth to facilitate entry of an insulated conductor into the groove.

Further, the connector module 181 is formed so that it can be mounted on the index strip 141 in secured engagement therewith. The central body portion which is formed by the assembly of the parts includes downwardly depending side portions 191—191 having a plurality of spaced alternating height depressions formed therebetween to facilitate receipt of the alternating height teeth of the index strip 141. Additional details of the connector module 181 and of the index strip 141 as well as the contact elements are found in the above-mentioned Ellis et al patent which is incorporated by reference hereinto.

When the blank plate 80 or the cover 75 is removed from the housing and the eight conductor module 181 is mounted on the index strip 141, end portions of the contact elements 185—185 are moved over the conductors 131—131 of the index strip, said conductors having previously been inserted into the grooves of the index strip 141. After the connector module 181 has been snap-locked to the index strip 141, the customer inserts each one of the conductors 166—166 from the jack 133 in the service ring plate 162 into a correct one of the conductor-receiving grooves 187—187 atop the connector module 181. As a result, these conductors 166—166 are caused to be moved into the slots of the contact elements 185—185 which have portions of the bifurcated beams thereof protruding into the conductor-receiving grooves 187—187 of the connector module. This establishes a plurality of electrical connections between the conductors and completes transmission paths between the jack 133 in the service ring plate 162 and the wall cable 135. The ring plate 162 is secured to the housing and the service plate 161 is fastened to the ring plate to complete the installation.

It is to be understood that the above-described arrangements are simply illustrative of the invention. Other arrangements may be devised by those skilled in the art which will embody the principles of the invention and fall within the spirit and scope thereof.

What is claimed is:

1. A receptacle which is adapted to be mounted within a wall and which is adapted to interconnect terminals of a modular plug with conductors of a service cable within the wall, said receptacle comprising:

a housing which is made of a dielectric material, said housing having a base with side walls projecting from the periphery of said base and an open side which is opposite to said base, means for mounting said housing to a structural support member within the wall, and means for mounting means for enclosing said open side;

means attached to and disposed within said housing for establishing an electrical connection with each of a plurality of conductors of the service cable, said means including a plurality of pedestals, which are formed integrally with said housing with each having a free end between said base and said open side of said housing and each having an opening formed therein, and a plurality of terminals each of which is adapted to be moved into one of said pedestal openings to secure an end portion of one of the conductors of the service cable in engagement with the pedestal, each said terminal being formed with a headed end which maintains the end portion of a conductor in engagement with a pedestal and which is spaced from said base of said housing by the pedestal;

cover means for enclosing said open side of said housing;

a modular jack mounted on said cover means, said modular jack including a cavity for receiving the modular plug and including a plurality of wire-like contact elements which are adapted to engage terminals of the plug when the plug is inserted into said cavity; and means disposed in said housing for connecting each of said contact elements of said jack which is mounted on said cover means to said means for establishing an electrical connection to connect said contact elements to the conductors of the service cable, said means for connecting each of said contact elements of said jack to said means for establishing an electrical connection with each conductor including a cap and a conductive member which is joined electrically to an associated contact element, each said cap being adapted to be snap-locked into engagement with the headed end of one of said terminals.

2. A receptacle which is adapted to be mounted within a wall and which is adapted to interconnect terminals of a modular plug that is connected to customer station equipment with conductors of a service cable within the wall, said receptacle comprising:
- a housing which is made of a dielectric material, said housing having an open side, means for mounting said housing to a structural support member, and means for mounting means for enclosing said open side, said housing also including a nest;
- a modular jack which is mounted in said nest and which includes a cavity for receiving a modular plug that terminates the service cable and a plurality of wire-like contact elements each of which has a portion that extends into said cavity to engage a terminal of a plug that is inserted into said cavity;
- cover means for enclosing said open side of said housing;
- a modular jack mounted on said cover means, said modular jack including a cavity for receiving the modular plug that is connected to the station equipment and including a plurality of wire-like contact elements which are adapted to engage the terminals of the plug; and
- means disposed in said housing for connecting each of said contact elements of said jack which is mounted on said cover means to said contact elements of said jack which is mounted in said nest of said housing.

3. The receptacle of claim 1, wherein said means for establishing an electrical connection with each conductor of the cable includes an index strip which is made of a dielectric material and which is connected to said housing, said index strip including an elongated base having a plurality of spaced conductor-receiving grooves formed transversely therealong, each said conductor-receiving groove communicating with a well.

4. The receptacle of claim 2, wherein said connecting means includes an index strip which is made of a dielectric material and which is connected to said housing, said index strip including an elongated base having a plurality of spaced conductor-receiving grooves formed transversely therealong, each said conductor-receiving groove communicating with a well, a first group of conductors which are received in said grooves of said index strip and which are connected to said contact elements of said jack in said nest, a connector module which is adapted to be seated in engagement with said index strip, said module including a plurality of spaced conductor-receiving grooves spaced transversely along one peripheral boundary thereof and a plurality of bifurcated beam contact elements mounted within said module with one beam of each extending into an aligned one of the conductor-receiving grooves in the module and with the other beam extending into an aligned well of the index strip to engage electrically said conductors of said first group when said connector module is mounted on said index strip, and a second group of conductors which are disposed in said grooves of said module and which are connected to said contact elements of said jack in said cover means.

5. The receptacle of claim 1, wherein said housing includes a wall having a plurality of tapered slots therein, said slots being adapted to receive a multi-conductor cord to provide strain relief therefor.

6. The receptacle of claim 2, wherein said contact elements of said jack in said enclosing means are connected through conductors to a plurality of contact elements which are mounted in a carrier, said receptacle also including a jack frame which is mounted in said nest of said housing, said carrier being adapted to be secured within said frame to present said contact elements of said carrier to a cavity of said frame in said nest to engage terminals of a plug which is inserted thereinto.

7. A receptacle for enclosing electrical connections, said receptacle adapted to be mounted within a wall and adapted to interconnect the electrical connections with terminals of a modular plug, said receptacle comprising:
- a housing which is made of a dielectric material, said housing having a rear wall and an open face which is opposite to and spaced from said rear wall and which is adapted to be substantially flush with an external surface of the wall;
- means attached to said housing for mounting said housing to a supporting member;
- means disposed within said housing for establishing an electrical connection with each one of a plurality of conductors of a service cable, said means for establishing an electrical connection including a plurality of terminal-receiving posts which project from said rear wall of said housing and which have free ends that are spaced substantially from said rear wall; and
- means connected to said housing for supporting a plate which covers said open face of said housing and which has a modular jack mounted thereto to facilitate the connection of a plug to said means for establishing an electrical connection with the conductors of the cable.

8. A receptacle for enclosing electrical connections, said receptacle adapted to be mounted within a wall and adapted to interconnect the electrical connections with terminals of a modular plug, said receptacle comprising:
- a housing which is made of a dielectric material, said housing having a rear wall and an open face which is opposite to and spaced from said rear wall and which is adapted to be substantially flush with an external surface of the wall, said housing including at least one nest for holding a modular jack which includes an outwardly facing cavity for receiving a modular plug that terminates a service cable and a plurality of wire-like contact elements that are adapted to engage electrically terminals of the plug when the plug is inserted into said cavity of the jack;
- means attached to said housing for mounting said housing to a supporting member;
- means disposed within said housing for establishing an electrical connection with each one of a plurality of conductors of the service cable; and
- means connected to said housing for supporting a plate which covers said open face of said housing and which has a modular jack mounted thereto to facilitate the connection of a plug to said means for establishing an electrical connection with the conductors of the cable.

9. The receptacle of claim 7, which also includes an index strip which is connected to said housing, said index strip including a plurality of conductor-receiving grooves which are formed between adjacent ones of a plurality of teeth that are upstanding from a base of said index strip, said teeth adapted to engage a conductor that is received in a groove with clamping forces which are sufficient to secure the conductor within the groove.

10. The receptacle of claim 8, which also includes at least a frame of a modular jack, said frame being mounted within said nest.

11. The receptacle of claim 10, which also includes an index strip that is connected to said housing, said index strip including a plurality of conductor-receiving grooves that are formed between adjacent ones of a plurality of teeth that are upstanding from a base of said index strip, said teeth adapted to engage a conductor that is received in a groove with clamping forces that are sufficient to secure the conductor within the groove, each of said contact elements in the jack being connected to an insulated conductor that is positioned within one of said grooves in said index strip.

12. A receptacle for enclosing electrical connections, said receptacle adapted to be mounted within a wall and adapted to interconnect the electrical connections with terminals of a modular plug, said receptacle comprising:

a housing which is made of a dielectric material, said housing having a rear wall and an open side which is spaced from said rear wall and which is adapted to be substantially flush with an external surface of the wall;

means attached to said housing for mounting said housing to a supporting member within the wall;

means connected to said housing for supporting a plate which covers said open side of said housing and which has a modular jack including a plurality of contact elements and a cavity for receiving a modular plug having a plurality of terminals which engage the contact elements when the plug is inserted into the cavity of the jack; and means disposed within said housing and having portions positioned between said rear wall and said open side of said housing for facilitating the establishment of an electrical connection with each of a plurality of conductors of a service cable so that subsequently the contact elements of a modular jack which is mounted in said supporting means are connectable to the conductors of the service cable through said facilitating means.

* * * * *